(12) United States Patent
Benson et al.

(10) Patent No.: US 7,487,460 B2
(45) Date of Patent: Feb. 3, 2009

(54) INTERFACE FOR PRESENTING DATA REPRESENTATIONS IN A SCREEN-AREA INSET

(75) Inventors: Rodger William Benson, Seattle, WA (US); Joseph Howard Matthews, Woodinville, WA (US); Mark Jeffrey Weinberg, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1000 days.

(21) Appl. No.: 10/394,614

(22) Filed: Mar. 21, 2003

(65) Prior Publication Data

US 2004/0183824 A1  Sep. 23, 2004

(51) Int. Cl.
*G09G 5/00* (2006.01)
*G06K 15/00* (2006.01)

(52) U.S. Cl. ............... 715/767; 715/726; 715/838

(58) Field of Classification Search ......... 715/727–729, 715/745–747, 741, 730–732, 719–726, 789, 715/790, 791, 802, 801, 805, 788, 778, 800, 715/804; 719/318, 328, 323; 709/318, 328; 725/40, 39

See application file for complete search history.

(56) References Cited

U.S. PATENT DOCUMENTS

| | | | |
|---|---|---|---|
| 5,517,257 A | 5/1996 | Dunn et al. | |
| 5,585,838 A | 12/1996 | Lawler et al. | |
| 5,600,368 A | 2/1997 | Matthews | |
| 5,606,374 A | 2/1997 | Bertram | |
| 5,623,613 A | 4/1997 | Rowe et al. | |
| 5,648,824 A | 7/1997 | Dunn et al. | |
| 5,654,748 A | 8/1997 | Matthews | |
| 5,677,708 A | 10/1997 | Matthews et al. | |
| 5,699,107 A | 12/1997 | Lawler et al. | |
| 5,721,829 A | 2/1998 | Dunn et al. | |
| 5,724,492 A | 3/1998 | Matthews et al. | |
| 5,751,282 A | 5/1998 | Girard et al. | |
| 5,758,258 A | 5/1998 | Shoff et al. | |
| 5,799,113 A | 8/1998 | Lee | |
| 5,805,763 A | 9/1998 | Lawler et al. | |
| 5,812,123 A | 9/1998 | Rowe et al. | |
| 5,815,145 A | 9/1998 | Matthews | |
| 5,838,320 A | 11/1998 | Matthews III et al. | |
| 5,874,985 A | 2/1999 | Matthews | |
| 5,900,905 A | 5/1999 | Shoff et al. | |
| 5,907,323 A | 5/1999 | Lawler et al. | |
| 5,910,996 A * | 6/1999 | Eggers et al. | ............... 381/107 |
| 5,914,746 A | 6/1999 | Matthews et al. | |
| 5,999,190 A * | 12/1999 | Sheasby et al. | ............. 345/589 |

(Continued)

*Primary Examiner*—Steven P Sax
(74) *Attorney, Agent, or Firm*—Shook, Hardy & Bacon, L.L.P.

(57) ABSTRACT

A method, application interface, and medium is provided for presenting a variety of data representations in a screen-area inset. The inset(s) can be one or more bounded portions of a graphical user interface. The inset offers a picture-in-picture type of functionality to present videos, data, pictures, audio, and other data representations in a persistently viewable screen area that does not consume the entirety of a display device. The API includes instructions to allow software components to use the inset. The method includes receiving one or more event requests related to the inset, communicating them to a software application or operating system, receiving one or more data sets to satisfy the event requests, and communicating the data sets to the original software application to present a data representation in the inset.

32 Claims, 11 Drawing Sheets

U.S. PATENT DOCUMENTS

| | | |
|---|---|---|
| 6,005,602 A | 12/1999 | Matthews |
| 6,008,803 A | 12/1999 | Rowe et al. |
| 6,028,604 A | 2/2000 | Matthews, III et al. |
| 6,072,485 A | 6/2000 | Barnes et al. |
| 6,144,848 A | 11/2000 | Walsh et al. |
| 6,202,212 B1 | 3/2001 | Sturgeon et al. |
| 6,240,555 B1 | 5/2001 | Shoff et al. |
| 6,266,059 B1 | 7/2001 | Matthews, III et al. |
| 6,313,851 B1 | 11/2001 | Matthews, III et al. |
| 6,314,569 B1 | 11/2001 | Chernock et al. |
| 6,344,865 B1 | 2/2002 | Matthews, III et al. |
| 6,404,747 B1 * | 6/2002 | Berry et al. ............... 370/270 |
| 6,466,238 B1 | 10/2002 | Berry et al. |
| 6,469,721 B2 | 10/2002 | Matthews, III et al. |
| 6,493,733 B1 * | 12/2002 | Pollack et al. ............. 715/513 |
| 6,545,722 B1 | 4/2003 | Schultheiss et al. |
| 6,631,523 B1 | 10/2003 | Matthews, III et al. |
| 6,651,251 B1 | 11/2003 | Shoff et al. |
| RE38,376 E | 12/2003 | Matthews, III |
| 6,724,405 B2 | 4/2004 | Matthews, III et al. |
| 6,750,890 B1 * | 6/2004 | Sugimoto ................... 715/838 |
| 6,784,855 B2 | 8/2004 | Matthews et al. |
| 6,892,359 B1 * | 5/2005 | Nason et al. ................ 715/788 |
| 6,898,765 B2 | 5/2005 | Matthews, III et al. |
| 6,971,071 B1 | 11/2005 | Impas et al. |
| 7,137,135 B2 * | 11/2006 | Schein et al. ................. 725/40 |
| 7,155,729 B1 | 12/2006 | Andrew et al. |
| 7,183,999 B2 | 2/2007 | Matthews et al. |
| 2002/0196268 A1 | 12/2002 | Wolff et al. |
| 2003/0161615 A1 * | 8/2003 | Tsumagari et al. ............ 386/95 |
| 2004/0172658 A1 * | 9/2004 | Rakib et al. ................. 725/120 |
| 2006/0020974 A1 * | 1/2006 | Birnbaum et al. ............ 725/50 |
| 2006/0064583 A1 * | 3/2006 | Birnbaum et al. ........... 713/164 |

* cited by examiner

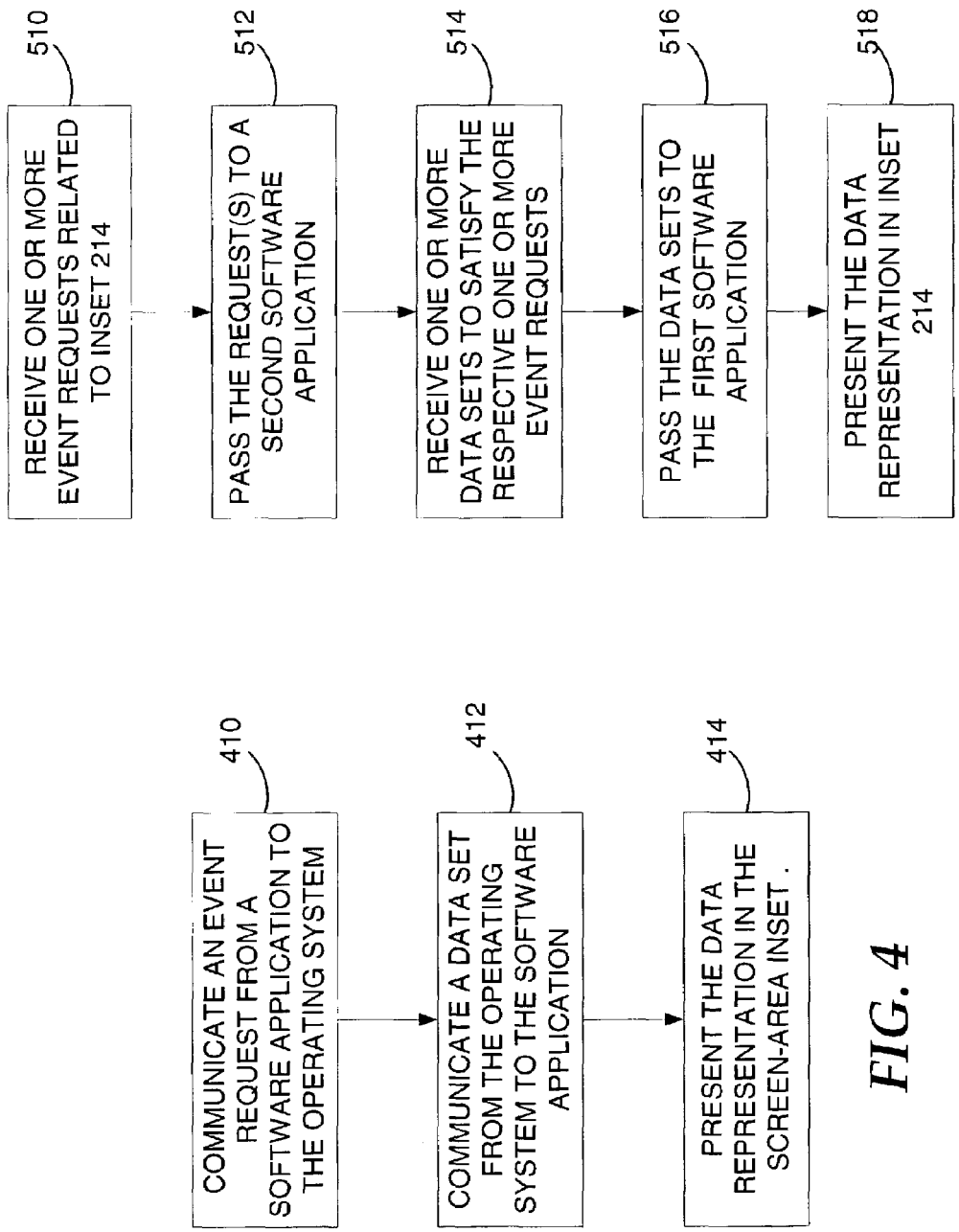

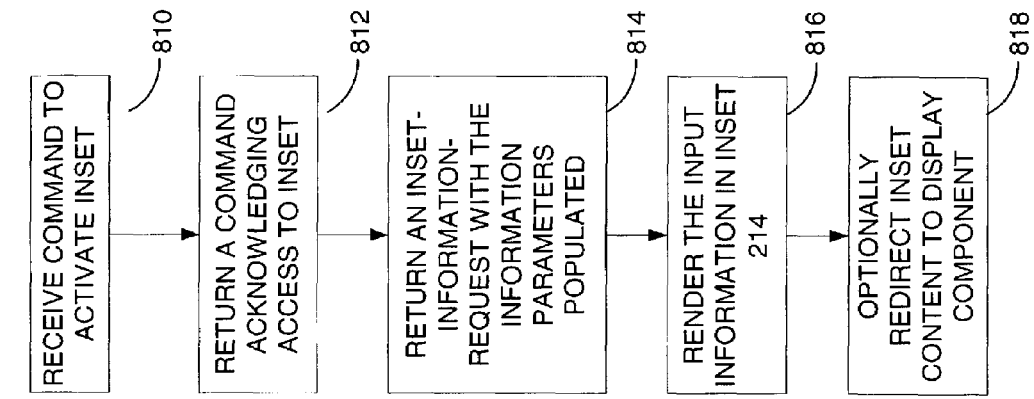
FIG. 8
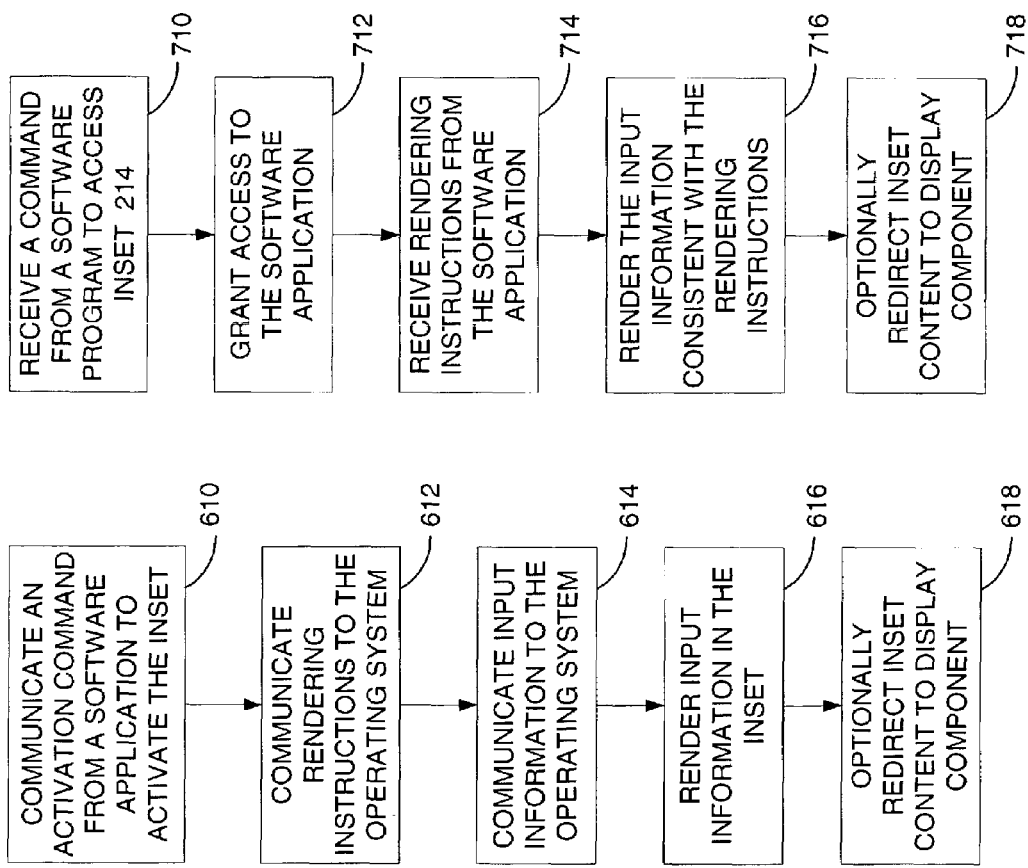
FIG. 7
FIG. 6

INTERFACE FOR PRESENTING DATA REPRESENTATIONS IN A SCREEN-AREA INSET

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The present invention relates to software application programming. More particularly, the present invention provides an application program interface (API) that enables a data representation to be presented in a screen-area inset of a user interface.

BACKGROUND OF THE INVENTION

General purpose computing systems (computers) are becoming ever more ubiquitous. Having a computer in living areas is becoming more desirous as the functionality of computers increases. Where living space is limited, having multiple entertainment devices such as a stereo unit, a computer, and a television may not be feasible. But if a computer is to fill the entertainment-option gaps left by removing a television, stereo system, etc., then it must be able to provide comparable functions.

Historically, computers have received input through a keyboard. This keyboard was often physically attached to the central processing unit and monitor. Later, the keyboard was tethered by a cord, which offered greater flexibility to a user. Like keyboards, the user interface of the computer has also evolved. User interfaces transitioned from character-based to graphics-based as typified by the many flavors of the WINDOWS® operating system provided by Microsoft Corporation of Redmond, Wash. Still, the computer-operating paradigm deviated little from providing a "two-foot" user interface (2'UI). A 2'UI is a user interface that contemplates a user operating the computer from about two feet away from the display device. Such a paradigm does not always lend itself to the preferences of today's users.

Accordingly, effort is under way to invent new and useful products that solve problems associated with antiquated computer-usage paradigms. For instance, a Distance User Interface (DUI) is described in the nonprovisional application entitled User Interface For Operating A Computer From A Distance, Ser. No. 10/174,619, filed on Jun. 19, 2002, by Parker, et al., and commonly assigned to the assignee of the present invention, incorporated by reference herein. The DUI provides an interface to operate a computer from across a room. Such an invention conserves resources by enabling a computer to replace at least a stereo receiver, television, radio, and VCR.

With an Internet and/or cable-TV connection for example, a computer can be used to watch television or listen to radio programming by using a remote control from a distance. But a computer should be able to offer more functionality than a television, stereo, or VCR. At least one other function includes an ability to view or preview a data representation or multimedia experience without having to dedicate viewing to only that data representation. There is a need for a picture-in-picture (PIP) type of functionality in a computer-operating environment. Moreover, there is a need for an application program interface (API) to make available such PIP functionality in a general-computing environment.

SUMMARY OF THE INVENTION

The present invention generally relates to an API that enables a computer system to provide PIP functionality to a variety of data representations. The term "PIP functionality" is not to be confused with "PIP" alone. PIP is an option that allows two television programs to be viewed simultaneously. As used herein, "PIP functionality" is a term intended to convey the nature of the functionality offered by the present invention, which includes enabling data to be presented in a screen-area inset. Thus, the present invention is an interface or set of interfaces that allow a data representation to be presented in a portion of a user interface.

The present invention offers several practical applications in the technical arts, including allowing a first software application to interface with a second software application, including an operating system, to present a media experience in an inset or portion of a user interface. Such an interface conserves resources, increases productivity, and fosters multitasking by allowing one or more media presentations to be displayed in a portion of a user interface.

BRIEF DESCRIPTION OF THE SEVERAL VIEWS OF THE DRAWINGS

The present invention is described in detail below with reference to the attached drawing figures, wherein:

FIGS. 4-8 are flow diagrams illustrating exemplary processes carried out by the present invention.

DETAILED DESCRIPTION OF THE INVENTION

The present invention provides an interface for applications to use a screen-area inset of a graphical-user interface (GUI) to present a variety of media experiences or data representations. In a preferred embodiment, the interface is used in conjunction with an operating system, such as the WINDOWS® operating system, to allow a software vendor access to the inset to display an array of media presentations and offer functionality for controlling such presentations. The present invention should not be construed as limited to the WINDOWS® operating system. Rather, the present invention is applicable to operating systems in general, including LINUX, MACINTOSH®, Lindows, UNIX and others as well as embedded operating systems. An embedded operating system offers a suitable operating environment for practicing the present invention using devices such as personal electronics, smart phones, personal data assistants (PDAs), palm-top computers, paging devices, digital video recorders (DVR), smart displays, gaming units, and other devices as would be apparent to one of ordinary skill in the relevant art. Exemplary DVR units include the TIVO unit made by TiVo Incorporated of Alviso, Calif. and the REPLAY units made by Sonicblue Incorporated of Santa Clara, Calif. In a preferred embodiment, the inset is part of an operating system, and the present invention allows third-party software components to use the inset.

Having briefly described an embodiment of the present invention, an exemplary operating environment for the present invention is described below.

Exemplary Operating Environment

Figure 1:
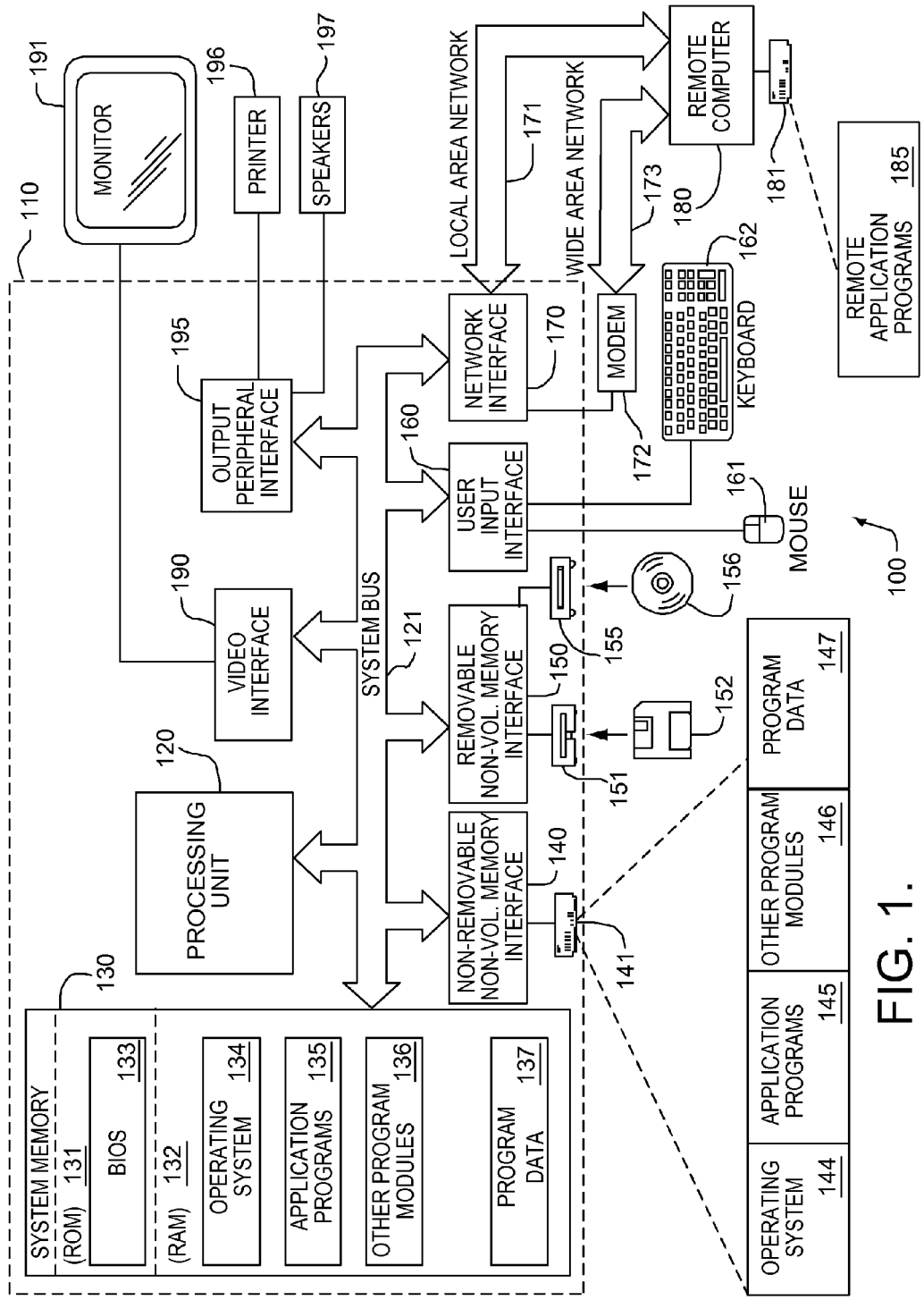
FIG. 1 is a block diagram of a computing system environment suitable for use in implementing the present invention.

Referring to the drawings in general and initially to FIG. 1 in particular, wherein like reference numerals identify like components in the various figures, an exemplary operating environment for implementing the present invention is shown and designated generally as operating environment 100. The computing-system environment 100 is only one example of a suitable computing environment and is not intended to suggest any limitation as to the scope of use or functionality of the invention. Neither should the computing-environment 100 be interpreted as having any dependency or requirement relating to any one or combination of components illustrated in the exemplary operating environment 100.

The invention may be described in the general context of computer code or computer-executable instructions, such as program modules, being executed by a computer. Generally, program modules include routines, programs, objects, components, data structures, etc., refers to code that performs particular tasks or implements particular abstract data types. Moreover, those skilled in the art will appreciate that the invention may be practiced with a variety of computer-system configurations, including hand-held devices, multiprocessor systems, microprocessor-based or programmable-consumer electronics, minicomputers, mainframe computers, and the like. The invention may also be practiced in distributed computing environments where tasks are performed by remote-processing devices that are linked through a communications network. In a distributed computing environment, program modules may be located in both local and remote computer storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory 130 to the processing unit 120.

Computer 110 typically includes a variety of computer-readable media. By way of example, and not limitation, computer-readable media may comprise computer storage media and communication media. Examples of computer storage media include, but are not limited to, Random Access Memory (RAM); Read Only Memory (ROM); electronically erasable programmable read-only memory (EEPROM); flash memory or other memory technology; CD-ROM, digital versatile disks (DVD) or other optical or holographic disc storage; magnetic cassettes, magnetic tape, magnetic disk storage or other magnetic storage devices; or any other medium that can be used to store desired information and accessed by computer 110. The system memory 130 includes computer-storage media in the form of volatile and/or nonvolatile memory such as ROM 131 and RAM 132. A basic input/output system 133 (BIOS), containing the basic routines that help to transfer information between elements within computer 110 (such as during start-up) is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD-ROM or other optical media. Other removable/nonremovable, volatile/nonvolatile computer storage media that can be used in the exemplary operating environment include, but are not limited to, magnetic tape cassettes, flash memory units, digital versatile discs, digital video tape, solid state RAM, solid state ROM, and the like. The hard disk drive 141 is typically connected to the system bus 121 through a nonremovable memory interface such as interface 140. Magnetic disk drive 151 and optical disc drive 155 are typically connected to the system bus 121 by a removable memory interface, such as interface 150.

The drives and their associated computer storage media discussed above and illustrated in FIG. 1 provide storage of computer-readable instructions, data structures, program modules and other data for computer 110. For example, hard disk drive 141 is illustrated as storing operating system 144, application programs 145, other program modules 146, and program data 147. Note that these components can either be the same as or different from operating system 134, application programs 135, other program modules 136, and program data 137. Typically, the operating system, application programs and the like that are stored in RAM are portions of the corresponding systems, programs, or data read from hard disk drive 141, the portions varying in size and scope depending on the functions desired. Operating system 144, application programs 145, other program modules 146, and program data 147 are given different numbers here to illustrate that, at a minimum, they can be different copies. A user may enter commands and information into the computer 110 through input devices such as a keyboard 162; pointing device 161, commonly referred to as a mouse, trackball or touch pad; or a wireless-signal-reception component 163. Other input devices (not shown) may include a microphone, joystick, game pad, satellite dish, scanner, or the like. These and other input devices are often connected to the processing unit 120 through a user input interface 160 that is coupled to the system bus 121 but may be connected by other interface and bus structures, such as a parallel port, game port, IEEE 139A port, or a universal serial bus (USB).

A display device 191 is also connected to the system bus 121 via an interface, such as a video interface 190. Video interface 190 could also accept an incoming video signal 189. Display device 191 can be any device to display the output of computer 110 not limited to a monitor, an LCD screen, a TFT screen, a flat-panel display, a conventional television, or screen projector. In addition to the display device 191, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local-area network (LAN) 171 and a wide-area network (WAN) 173 but may also include other networks, such as connections to a metropolitan area network (MAN), intranet, or the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. Modem 172 could be a cable modem, DSL modem, or other broadband device. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well-known. For example, including various expansion cards such as television-tuner cards and network-interface cards within a computer 110 is conventional. Accordingly, additional details concerning the internal construction of the computer 110 need not be disclosed in connection with the present invention.

When the computer 110 is turned on or reset, the BIOS 133, which can be stored in ROM 131, instructs the processing unit 120 to load the operating system, or necessary portion thereof, from the hard disk drive 141 into the RAM 132. Once the copied portion of the operating system, designated as operating system 144, is loaded into RAM 132, the processing unit 120 executes the operating-system code and causes the visual elements associated with the user interface of the operating system 134 to be displayed on the display device 191. Typically, when an application program 145 is opened by a user, the program code and relevant data are read from the hard disk drive 141 and the necessary portions are copied into RAM 132, the copied portion represented herein by reference numeral 135.

API for Inset Presentation

As previously mentioned, the present invention may be described in the general context of computer-executable instructions such as program modules executed by one or more computers or other devices. Typically, the functionality of the program modules may be combined or distributed as desired in various embodiments.

Figure 2A:
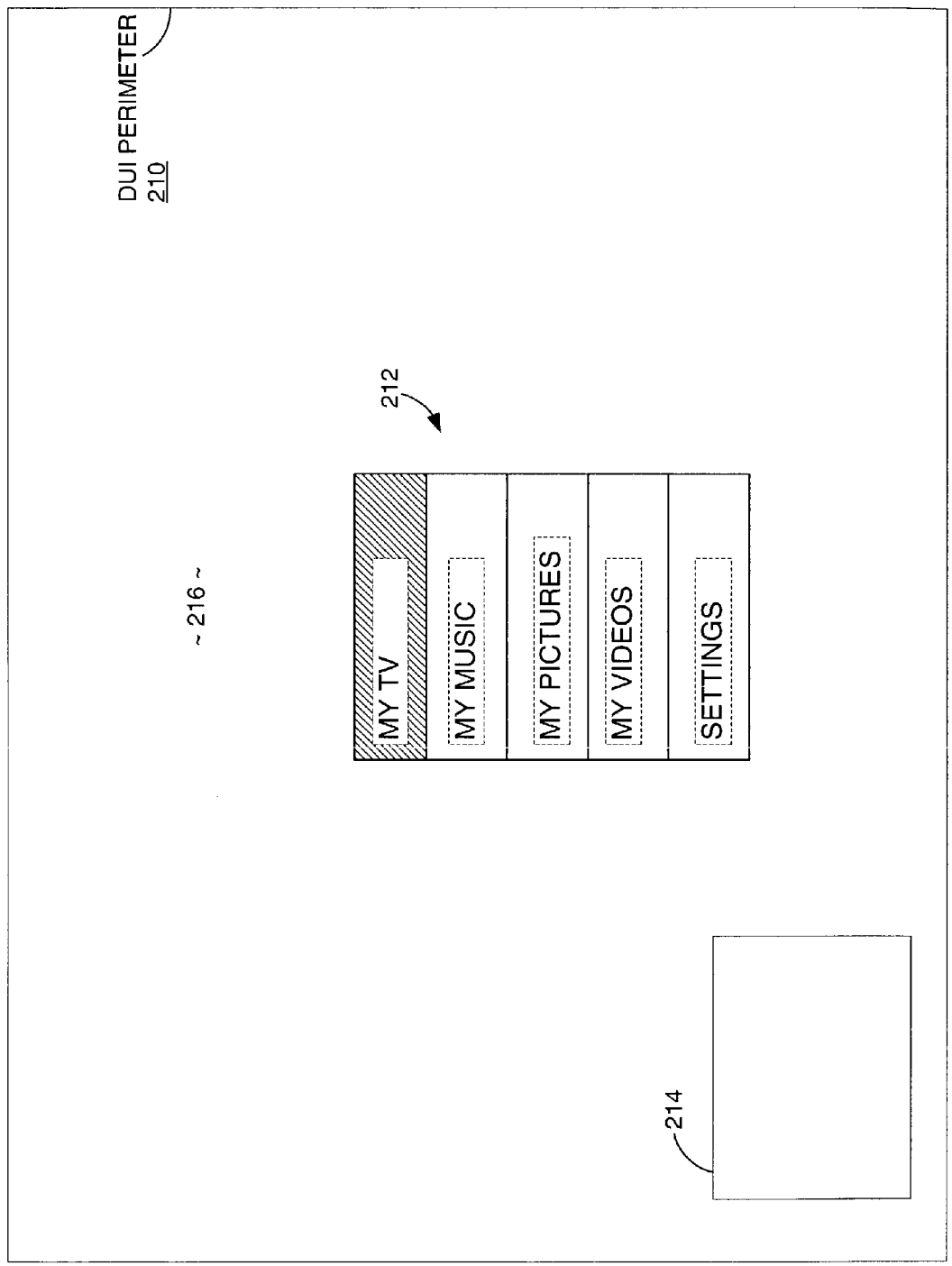
FIG. 2A is a diagram of an exemplary distance user interface (DUI)

FIG. 2A depicts one screen of a Distance User Interface (DUI) having a DUI perimeter 210 and a group of selectable links 212. As described above, an exemplary DUI is provided in the nonprovisional application having Ser. No. 10/174,619. A DUI enables a computer to be operated from a television-viewing distance. In a preferred embodiment of the present invention, a screen-area inset (inset) 214 is provided as an aspect of a DUI that allows a media experience to be persistently displayed while the background display 216 changes. However, the present invention is equally applicable to conventional user interfaces formatted to facilitate nearby computer operation.

Figure 2B:
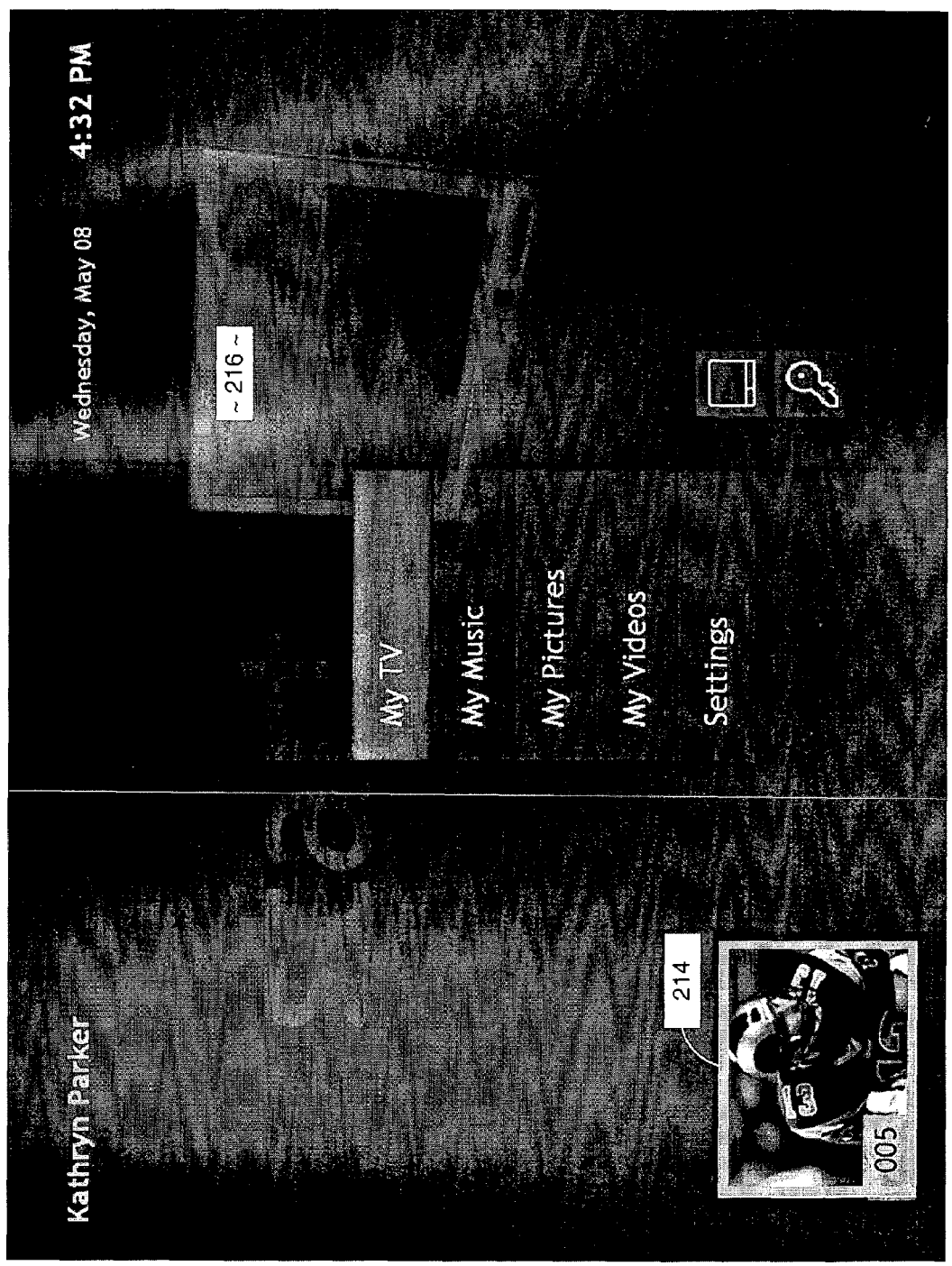
FIGS. 2B-2E are screen shots of the same exemplary DUI depicting that a common data representation can be persistently displayed across multiple screens.
Figure 2C:
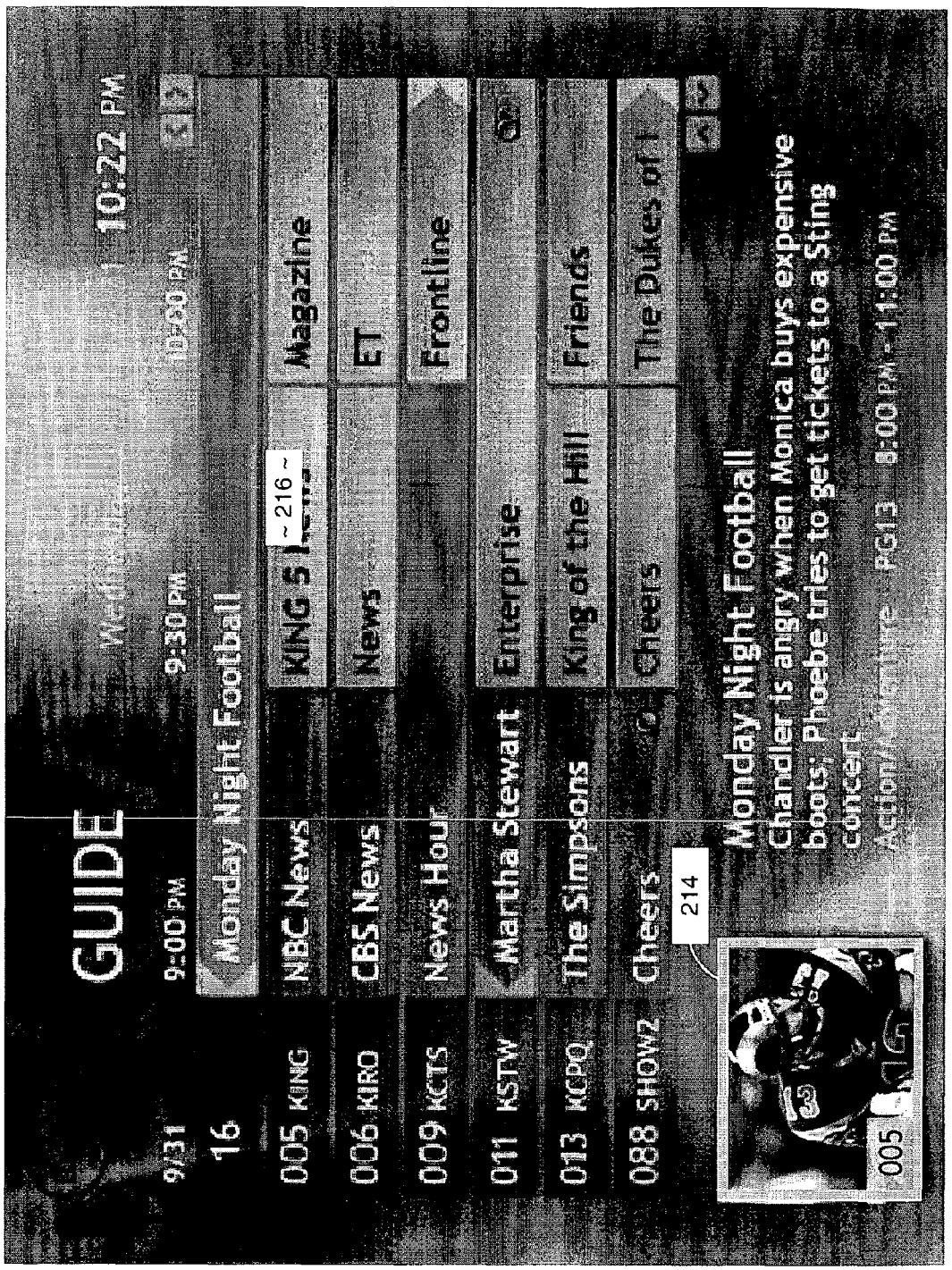
Figure 2D:
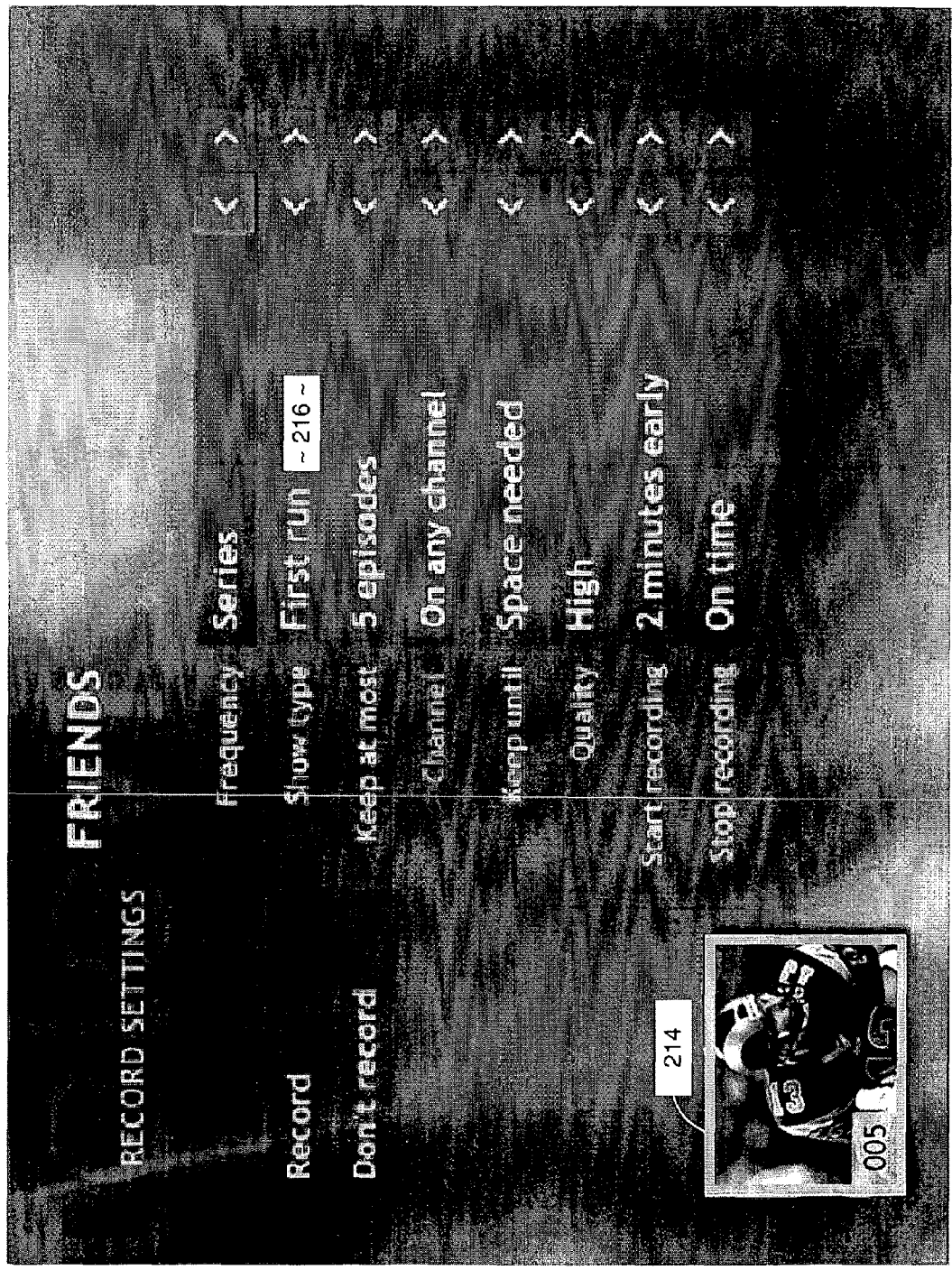
Figure 2E:
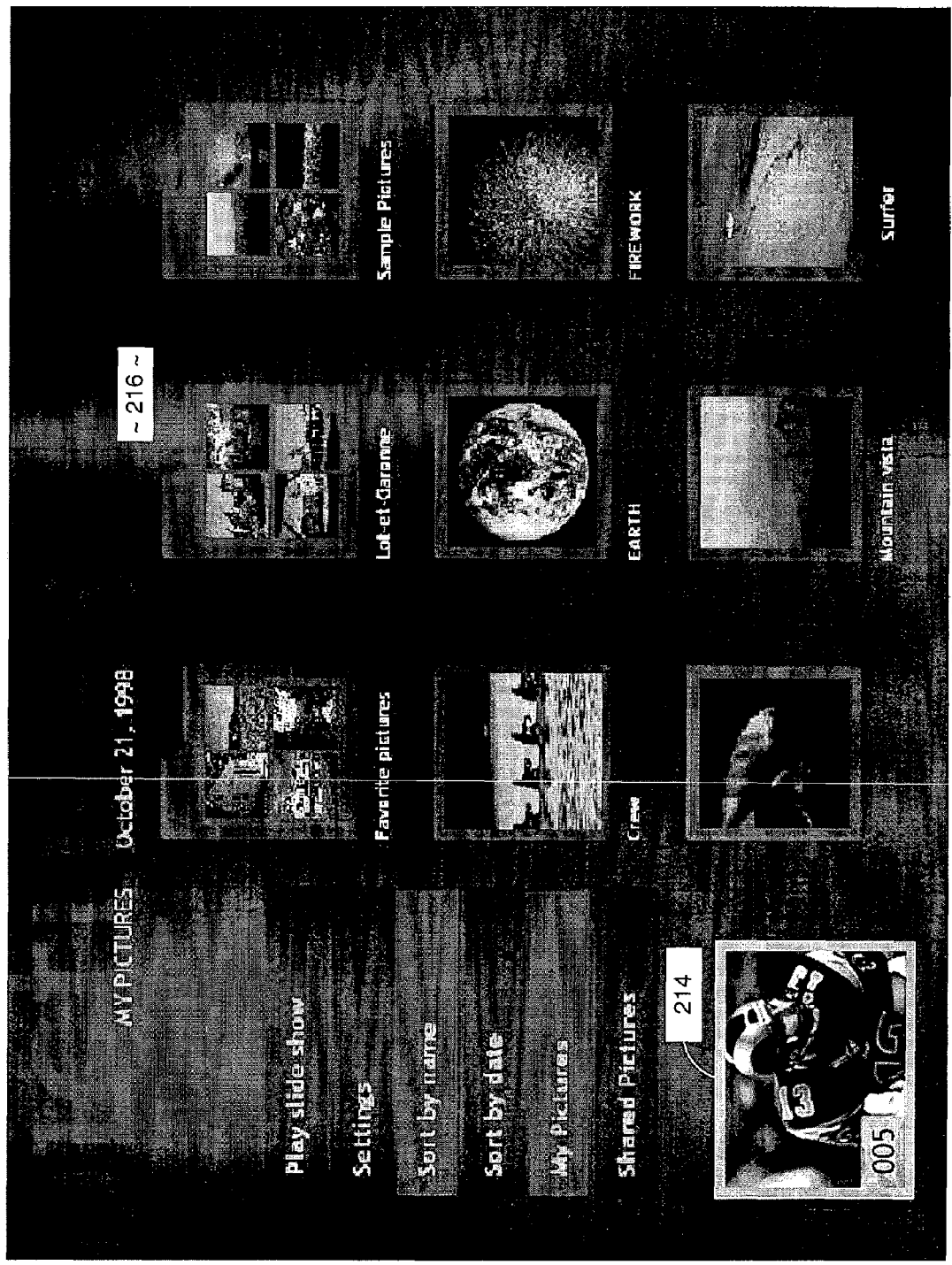

Inset 214 being persistently displayed through background screen 216 transitions is depicted with reference to the screen shots of FIGS. 2B-2E. FIG. 2B is a screen shot of the DUI shown in FIG. 2A. Inset 214 is illustratively shown presenting a television programming of a football game. FIG. 2C is another screen shot of the same DUI, but the background 216 has changed to a programming guide while inset 214 continues to display the football game. FIG. 2D shows still another changed background 216—a more detailed listings page—and illustrates that inset 214 continues to persistently display the football game in inset 214. Although many screens could provide as many examples, FIG. 2E illustrates an example of a pictures-display background screen with inset 214 continuing to show the football game. Thus, inset 214 can display one or more images or events even as the background user interface 216 varies in response to user input.

Figure 2F:
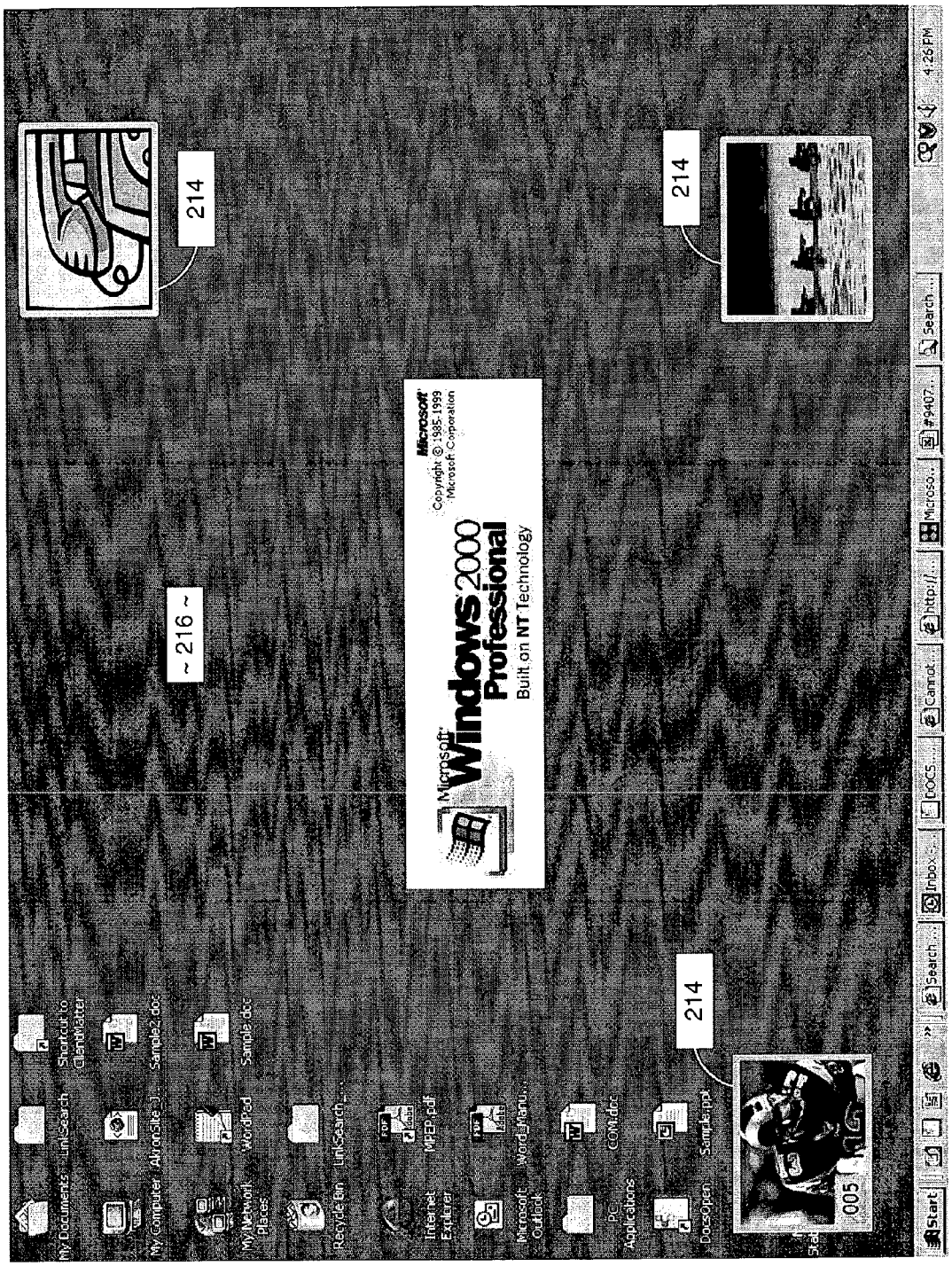
FIG. 2F is a screen shot depicting the present invention practiced in a conjunction with a conventional user interface (as opposed to a DUI) and illustrating that multiple insets can be presented simultaneously, each optionally presenting different data representations.
Figure 2G:
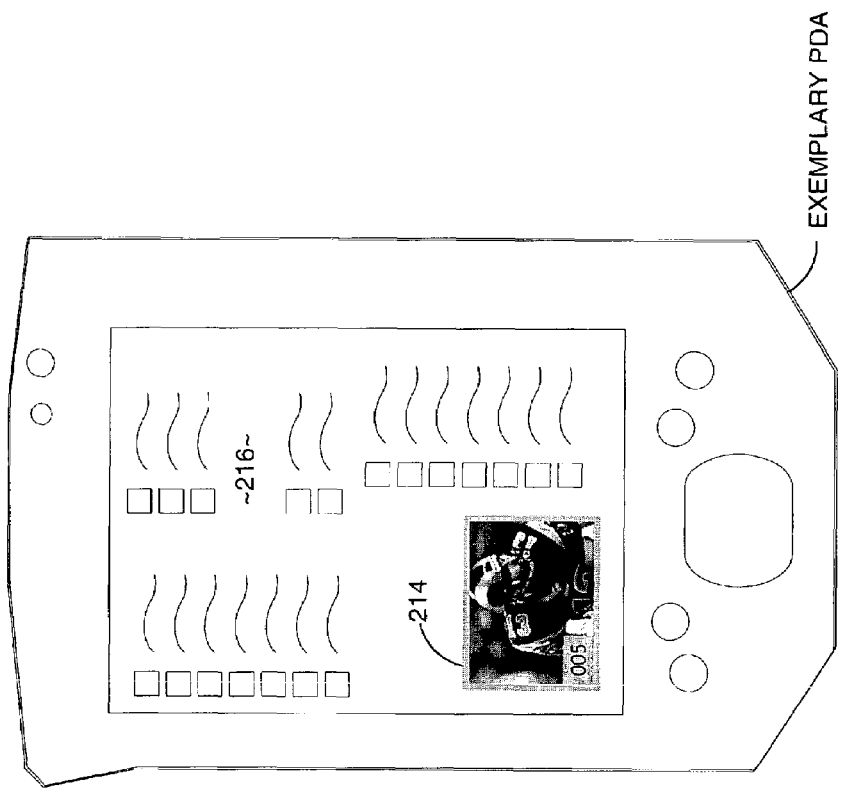
FIG. 2G depicts the present invention practiced in a conjunction with an exemplary consumer-electronics device.

FIG. 2F illustrates that the present invention is equally applicable to a conventional, nearby user interface. Moreover, multiple instances of screen-area inset 214 are shown in FIG. 2F. The various instances of screen-area inset 214 are not constrained to depicting the same data set. As can be seen from FIG. 2F, independent data representations can be presented in each instance of inset 214. As will be explained below, any instance of inset 214 can be directed to a display component, which includes an entirely separate display device. FIG. 2G depicts an exemplary implementation of the present invention in a consumer-electronics device, such as a PDA.

Accordingly, one function of inset 214 is to depict a data representation in a bounded area of a user interface. The data representation is not limited to television programming. Rather, the data representation presented can be any data representation communicated from any application, which includes an operating system or some other software application. The communicated data representation, including audio, could be at least a picture, album art, a video, a streaming-media presentation, a television program, an environment-attribute representation, a camera feed, a software-application preview, an audio rendition, an appliance status, a caller-ID message, an entertainment depiction, or a gaming-aspect representation.

Several examples, not to be interpreted as limiting the claims below, follow to illustrate a few exemplary functional attributes of the present invention. First, an image of a guest can be presented in the inset 214 in response to receiving a doorbell signal. Second, a picture can be presented of person engaged in an instant-messaging session on a wireless PDA.

Third, when the inset is a TV program or the like, not only is an overlay of the moving pictures presented on top of a background experience, but an overlay of the audio soundtrack from the TV with any music that may be part of the background experience is presented as well. In this way, an operating system may mix the sounds of a police chase depicted via inset 214 as well as operating-system sounds or any music that might be provided by a background media player, or even from sounds that may come from a second instance of inset 214.

Fourth, a slideshow may be presented in inset 214. Video images can be depicted in the inset as well as corresponding audio from a music file or the like. Fifth, an "alarm clock"

presentation may be depicted via inset 214, where the visual data might include the face of a clock and the audio would be the ticking of the second hand or the beeping of an alarm. In a final exemplary illustration, music may be presented in inset 214 where the video would be the cover art and the audio would be the song itself. Those skilled in the art will appreciate nearly variations on the above examples as well as the myriad other applications for the present invention.

Those skilled in the relevant art will appreciate that a picture can be presented in a variety of formats and file types. Exemplary file types include GIF, JPEG, bitmap, and TIFF images, but many others exist. Album art is art associated with the cover of a CD, tape cassette, or album and is typically associated with certain songs or audio files. CDs typically include CD covers that have pictures or an art rendition. These art renditions can also be rendered electronically. The electronic art forms are commonly associated with the songs on that CD. Inset 214 can display this art when a respective song or audio file is played.

A video can also be presented in an instance of inset 214. Previously recorded videos as well as videos embodied on other storage media such as DVDs can be played in inset 214. Movies stored in various media formats such as WINDOWS® Movie File, QUICKTIME® format, REAL® format, MPEG, or AVI files can be played in inset 214. Those skilled in the art will appreciate additional video formats that can be rendered and displayed in inset 214.

Streaming media is a sequence of moving images and/or sounds sent in native or compressed form over a network such as the Internet and displayed upon arrival. Streaming media encompasses at least video and audio, as well as additional tracks that may include captioning, URL links, and graphics. With streaming media, a Web user typically does not have to wait to download a large file before beginning to watch the video or hear the sound. Instead, the media is sent in a continuous stream and is played as it arrives in inset 214. Of the many diverse players, two exemplary streaming-video providers that may make use of inset 214 are RealNetworks, Inc. of Seattle Wash., and Apple Computer, Inc of Cupertino, Calif.

As previously mentioned, television programming can also be rendered in inset 214. Television programming contemplates more than mere broadcast television. Rather, television programming includes media received via satellite, high-definition television (HDTV), cable television (CATV), pay-per-view, or from an external device such as a VCR, DVD player, or personal video recorder.

Environment-attribute representations include such representations as the temperature status of an area or areas, statuses of entry ways and entry-way means such as doors and windows, illumination settings, humidity settings, and appliance settings. An example of an appliance setting would be a notification that a washing machine has stopped, a dryer has started, a garage door is open, etc. Other environment-type settings can also be presented in inset 214. Thus an end-user of the present invention may request the temperature of a certain room, and have that temperature visually presented in inset 214.

A camera feed can also be rendered in inset 214. Individuals and businesses often have cameras that receive and transmit images. These images can be shown in inset 214 while a user is in inset 214 operating the computer. The present invention would allow an end-user to observe a TV program in a main area of a user interface while watching in inset 214 a child play outside.

Inset 214 can also present previews of software applications. A common feature with WINDOWS® applications is the "Alt-Tab" feature. The Alt-Tab feature allows a user to hold down the alt key while pressing the tab key. Currently "Alt-Tab" presents only an icon of the current application. Inset 214, however, could be used to present a thumbnail presentation of the application. Such a feature would be useful if an individual had multiple instances of the same application open and wanted to see a visual representation of each application. For instance, if a user has five instances of the same application open, but with different documents in each instance, then inset 214 could present previews of the different documents as the user successively presses "Alt-Tab."

An audio rendition could also be presented in inset 214. Optional art, such as album art described above, could be associated with an audio file. Exemplary audio file formats include the .WMA, .MP3, and .WAV format. Those skilled in the art will appreciate additional audio formats that could be rendered and presented in inset 214. As an audio file is playing, the words to the file could be presented in inset 214. Alternatively, images or other various depictions that coincide to the beat of the music could be presented in inset 214.

The status of one or more appliances could also be presented in inset 214 as briefly mentioned above. As homes become smarter and more interconnected, various appliances are being equipped with feedback options. These feedback options could be used to provide status presentations in inset 214. For example, if a refrigerator reaches too high a temperature, an alert can be presented in inset 214. If a water-heater begins to leak, then a presentation can be depicted in inset 214. Similarly, presentation from other computers connected on a network could be presented in inset 214. Those skilled in the art will appreciate the myriad of other possibilities for depicting various statuses of appliance-type devices in inset 214.

Inset 214 can also be used to present a caller-ID message. The typical caller-ID message includes the telephone number of the caller. Using the present invention, a user could be operating a computer, receive a phone call, and have at least the telephone number presented in inset 214. Additional information such as a picture of the caller or the caller's name could also be provided in inset area 214.

A skilled artisan will also appreciate that additional entertainment depictions can be presented in inset 214. For instance, peer-to-peer activities can be presented in inset area 214. Inset 214 can also be used to depict gaming activities. For instance, a user may be operating the computer while playing a game in the inset area. The game being played in the inset area may involve additional players at remote locations with various depictions from the users presented in inset 214.

Having described inset 214 and its possible uses, the access to inset 214 is next described. An API is a collection of commands that enable a programmer to obtain services from an application. Those skilled in the art will appreciate that an API includes the functions, messages or commands, data structures, and/or data types used in creating applications. These applications typically run under an operating system. One type of API includes a command that points to a block of memory where another API request or requests are stored. An API can be employed as a functional interface between two components.

Figure 3A:
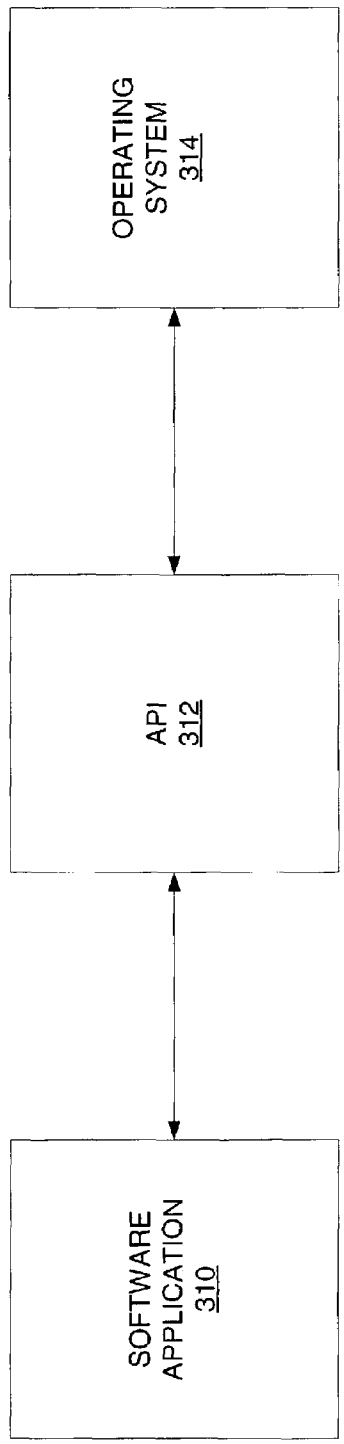
FIG. 3A is a block diagram illustrating the API implemented between a software application and an operating system.
Figure 3B:
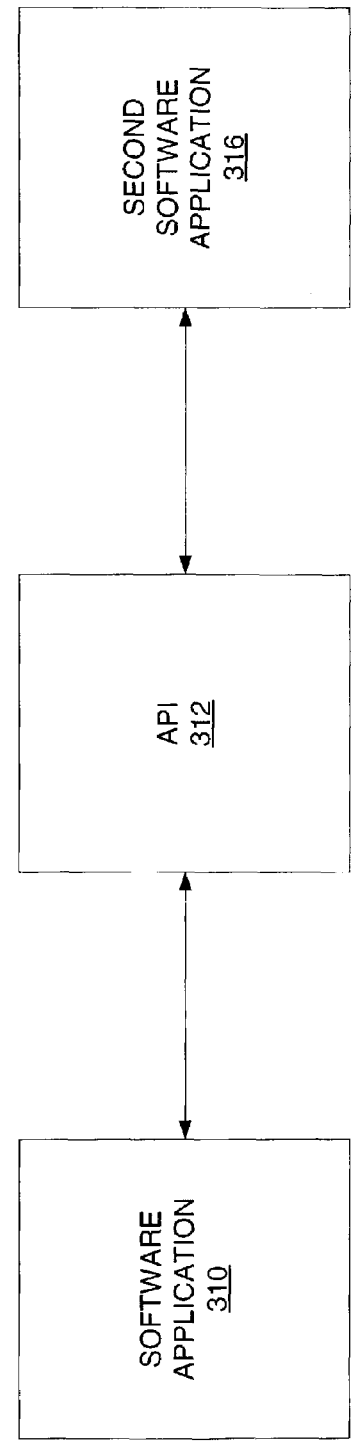
FIG. 3B is a block diagram illustrating the API implemented between a first software application and a second software application.

FIG. 3A shows an exemplary software application 310 using an API 312 and an operating system 314. In this preferred embodiment, API 312 permits software application 310 to interface with operating system 314 and render a data representation in inset 214. FIG. 3B shows an alternative embodiment where API 312 is used to interface software application 310 with a second software application 316 rather than operating system 314. The point of showing at least two embodiments is to illustrate the fact that the screen inset area 214 is not limited to interfacing with an operating system 314. Because inset 214 is preferably associated with an operating system 314, greater detail will be provided with reference to the embodiment illustrated in FIG. 3A. Limitation, however, should not be imparted onto the following discussion, for one skilled in the art would readily appreciate the fact that the API 312 used to associate a software application with inset 214 could be used to associate or to render a data representation controlled by software application 310 with virtually any software application.

Software application 310 depicted in FIG. 3A could be one of application programs 135, application programs 145, or any other program data shown in FIG. 1. Similarly, operating system 314 could be operating system 134 or operating system 144. Operating system 314 is numbered as such to promote clarity and ease of understanding of how API 312 allows a software application to interact with an operating system.

FIG. 4 depicts an embodiment of a method performed by the present invention. API 312 performs a method to interface software application 310 with operating system 314 to cause a data representation to be displayed in inset 214. At a step 414, software application 310 communicates an event request to operating system 314. This event request, as explained in greater detail below, could be in a variety of forms. For example, the event request could be, but is not limited to, a processing call, data request, or function call.

One or more event requests can be communicated to operating system 314. The event requests relate to inset 214. For instance, API 312 may include a request for naming an inset-presentation source. Exemplary inset-presentation sources include software application 310 itself, video memory, hard disk drive 141, optical disc 156, application programs 135 or 145, or other system components shown in FIG. 1.

The event request(s) can also include a request to host or not host inset 214. To host inset 214 is to associate inset 214 with an application. An exemplary hosting operation may be to place the inset 214 within an Internet browser. This way, a user can peruse the Internet while observing inset 214 as a frame within the browser. The framed inset 214 is capable of depicting all of the different types of data representations previously described. Other exemplary hosting options include hosting inset 214 in a navigation bar or in some other software application.

At a step 412, a data set is passed from operating system 314 to software application 310. That is, one or more data sets necessary to satisfy the respective event request(s) are sent back to software application 310 so that inset 214 can present the data representation on a display device. The data representation can be at least any of the forms described above. The data sets fulfill programmatic calls, satisfy function calls, and/or acknowledge other requests.

FIG. 5 depicts an alternative embodiment of a method performed by the present invention. In this embodiment, API 312 interfaces a first software application 310 with a second software application 316 to allow the first software application 310 to cause a data representation to be persistently presented in inset 214. This embodiment is provided to illustratively convey that the scope of the present invention extends beyond interfacing with an operating system 314, but contemplates interfacing with other software, firmware or hardware.

At a step 510, API 312 receives one or more event requests from first software application 310. As explained above, the event requests are related to inset 214.

At a step 512, the event request(s) are passed to second software application 316. One or more data sets necessary to satisfy the respective one or more event requests are received at a step 514. The data set(s) fulfill the programmatic and/or function calls that compose the event requests. Software application 310 requires data to render the data representation in inset 214. The data sets provide this information. At a step 516, API 312 passes the data sets to software application 310. Software application 310 processes the data sets to present the data representation in inset 214. The data representation can include an environment-attribute representation, not limited to a temperature reading or an entry-way-means status.

The event requests are requests by the software application 310 for information necessary to render the data representation. Exemplary event requests include requests to activate inset 214; for screen-location information of inset 214; to prepare inset 214 to render the data representation; to adjust the dimensions of inset 214, including minimizing and maximizing it; to adjust the picture quality of inset 214; to facilitate input and output of data from software application 310; to display inset 214 as a component within a software application; to display the data representation in response to an inputted key sequence; for information related to a file to be presented in inset 214; and to terminate communication with the inset. Those skilled in the art will appreciate that the aforementioned list is exemplary only and that a myriad of other requests can be made for information to render a certain data representation in inset 214. Moreover, the operating system could expose conventional end-user settings controls using similar API attribute requests. These controls include such functionality as resizing or closing the window.

Thus, the present invention allows the event requests listed above to activate or deactivate inset 214. Screen-location information includes information related to where inset 214 will appear or should appear on a display device. Media-event-preparation commands prepare inset 214 to be displayed in a user interface. The dimensions of inset 214 can be manipulated using the present invention. Picture quality, such as number of colors, resolution, and refresh rate of inset 214 can be changed using the present invention. The API 312 also facilitates input and output of data from software application 310 to second software application 316. API 312 can also be used to display inset 214 as a component within a software application. Thus, a slide show or picture can be presented in inset 214 as a part of a word-processing program or multimedia presentation.

As briefly mentioned above, inset 214 can respond to an inputted key sequence. For example, in response to a user pressing "Alt-Tab," a preview of various open applications can be presented in inset 214. Such a presentation would give a user a better idea of the contents of various windows, each running a separate application. API 312 may be used to present a file in inset 214. For example, a user may upload a recorded video. A third-party software application could use API 312 to recall the video and render it in inset 214. Those skilled in the art will appreciate that the aforementioned list is exemplary only and that a myriad of other requests can be made for information to render a certain data representation.

The data set or sets received in response to submitting the event requests include information necessary to satisfy the event requests. For example, the data sets could include at least: an acknowledgement to activate inset 214; screen-location information related to displaying inset 214; an acknowledgement that inset 214 is prepared to render the data representation; an acknowledgement that the dimensions of inset 214 are or have been modified; input and output data from first software application 310; and information related to a file to be presented in inset 214. Skilled artisans will appreciate still more or different data sets to satisfy the event requests of software application 310.

FIG. 6 depicts still another alternative embodiment of a method performed by the present invention. In this embodiment, a method is provided to use inset 214 by receiving an activation command from a software application such as software application 310 to activate screen-area inset 214 at a step 610. API 312 communicates rendering instructions to another component, such as operating system 314 at a step 612. At a step 614, API 312 communicates input information to operating system 314. Finally, the input information is rendered at a step 616 in inset 214 consistent with the rendering instructions. Input information includes data to be rendered in inset 214. Thus, input information can be data, video, or audio information as described above. At an optional step 618, the data representation with inset 214 can be redirected a display component. Exemplary display components include the primary screen or background display 216, any other window, or another display device such as a remote monitor. Thus a user may be browsing the internet, receive an invitation to play a game over the Internet, have a preview of the game presented in inset 214, and then direct the data representation of inset 214 to be depicted on an HDTV unit for a more enjoyable gaming experience. Those skilled in the art will appreciated the litany of other possibilities related to this and other examples.

FIG. 7 depicts still another embodiment of a method performed by the present invention. At a step 710, a command is received from software application 310 to access inset 214, which can be persistently displayed on a display device. API 312 allows access to be granted, at a step 712, to software application 310 to use inset 214. Multiple insets, similar to inset 214, can be displayed on a display device. For each inset 214, these steps are fulfilled. At a step 714, rendering instructions are received from software application 310 that dictate how received input information is to be presented. Finally, the input information is rendered at a step 716 in inset 214 consistent with the rendering instructions. At an optional step 718, the data representation with inset 214 can be redirected a display component in a manner similar to that of step 616.

FIG. 8 represents a flow diagram of a final exemplary method facilitated by the present invention. At a step 810, an activation command is received from software application 310. The activation command is a command used to access or activate inset 214. A person of ordinary skill in the art would understand the syntax of these and other commands referred to herein. Moreover, the skilled artisan would appreciate that the function described herein could be implemented in a variety of computer languages (such as C, C++, Java, and BASIC) using a variety of syntax variances. For instance, references regarding interfacing with a WINDOWS® environment abound, including the MICROSOFT DEVELOPER'S NETWORK (MSDN®) available via the Internet at http://www.msdn.microsoft.com/.

API 312 facilitates the return of an acknowledgement command granting access to software application 310 at a step 812. This command notifies software application 310 that it can have access to one or more insets 214. API 312 then allows an inset-information-request call to be received. The inset-information-request call has one or more information parameters useable by software application 310. At a step 814, API 312 enables an inset-information-request to be returned with the information parameters populated. The populated or returned parameters are used by software application 310 to determine how to present a data representation in inset 214. Finally, the present invention communicates data, at a step 816, using the software application so it can be presented in inset 214. The information can be any of the various aforementioned data representations. At an optional step 818, the data representation with inset 214 can be redirected a display component in a manner similar to that of step 616.

As can be understood, the API described herein allows a software application to interface with a second software application and cause a data representation to be persistently presented in a screen-area inset 214. In addition, an inset 214 is provided for enjoying a media experience while maintaining the ability to operate a computer using a background-user interface. The applications of the present invention abound. The present invention could be practiced in a gaming environment in connecting with gaming and other hardware such as smart displays.

The present invention has been described in relation to particular embodiments, which are intended in all respects to be illustrative rather than restrictive. Alternative embodiments will become apparent to those skilled in the art to which the present invention pertains without departing from its scope.

From the foregoing, it will be seen that this invention is one well-adapted to attain all the ends and objects set forth above, together with other advantages which are obvious and inherent to the system and method. It will be understood that certain features and subcombinations are of utility and may be employed without reference to other features and subcombinations. This is contemplated and within the scope of the claims.

The invention claimed is:

1. One or more computer-storage media having embodied thereon an interface that allows a software application to facilitate a method of presenting a variety of data representations in a screen-area inset of a distance user interface presented on a display device, which distance-user interface includes a background area and the screen-area inset within the background area, the method comprising:

providing said distance user interface (DUI), wherein said DUI comprises:

a menu display in a first layer, the menu display including a first plurality of selectable links that are disposed within said layer, each selectable link having a functional identifier discernable by a user from a television-viewing distance, said menu display allowing for the operation of said computer, wherein said television-viewing distance in feet is approximately half a viewable screen size of said display device measured in inches, and a selectable-link marker indicating which of the first plurality of selectable links has the focus;

communicating one or more commands from the software application to the screen-area inset, the screen-area inset having an ability to present one or more of a plurality of media experiences on said DUI; and communicating information to the screen-area inset, wherein the information is rendered and persistently presented in the inset without regard to changes in the background that does not include said screen-area inset.

2. The media of claim 1, wherein the information rendered includes audio data.

3. One or more computer-storage media having computer-useable instructions embodied thereon for performing a method of presenting data in a screen-area inset of a distance user interface (DUI), which distance-user interface includes a background area and the screen-area inset within the background area, the method comprising:

communicating to the DUI one or more event requests related to rendering data in the screen-area inset, wherein said DUI comprises a menu display in a first layer, the menu display including a first plurality of selectable links that are disposed within said layer, each selectable link having a functional identifier discernable by a user from a television-viewing viewing distance, wherein said television-viewing distance in feet is approximately half a viewable screen size of said display device measured in inches, said menu display allowing for the operation of said computer; and a selectable-link marker indicating which of the first plurality of selectable links has the focus; and receiving one or more data sets to help satisfy the respective one or more event requests so that the data may be persistently presented in the screen-area area inset in response to the one or more event requests without regard to changes in the background that does not include said screen-area inset.

4. One or more computer-storage media having computer-useable instructions embodied thereon for performing a method of presenting data in a screen-area inset of a distance user interface (DUI), which distance-user interface includes a background area and the screen-area inset within the background area, the method comprising:

communicating to the DUI one or more event requests related to rendering data in the screen-area inset, wherein said one or more requests includes a request to redirect said data representation to a communicatively coupled display component, the DUI comprising, a menu display in a first layer, the menu display including a first plurality of selectable links that are disposed within said layer, each selectable link having a functional identifier discernable by a user from a television-viewing distance, wherein said television-viewing distance in feet is approximately half a viewable screen size of said display device measured in inches, said menu display allowing for the operation of said computer, and a selectable-link marker indicating which of the first plurality of selectable links has the focus;

communicating to an operating system one or more audio-event requests that facilitate audio playback of audio that is associated with data being presented in the screen-area inset if present; and receiving one or more data sets to help satisfy the respective one or more event requests so that the data may be persistently presented in the screen-area area inset in response to the one or more event requests regardless of a change to the background that does not include said screen-area inset.

5. The media of claim 4, wherein said display component includes one or more of another window, another display device, and a remote monitor.

6. One or more computer-storage media having computer-useable instructions embodied thereon for performing a method of presenting a data representation in a screen-area inset of distance user interface (DUI), which distance-user interface includes a background area and the screen-area inset within the background area, the method comprising:

communicating to the DUI one or more event requests related to rendering data in the screen-area inset; wherein said one or more requests includes a request to display the inset as a component within a software application, wherein said DUI comprises, a menu display in a first layer, the menu display including a first plurality of selectable links that are disposed within said layer, each selectable link having a functional identifier discernable by a user from a television-viewing distance, wherein said television-viewing distance in feet is approximately half a viewable screen size of said display device measured in inches, said menu display allowing for the operation of said computer, and a selectable-link marker indicating which of the first plurality of selectable links has the focus;

communicating to an operating system one or more event requests that facilitate playback of media that is associated with data being presented in the screen-area inset if present, the screen-area inset including the capability of presenting each of the following: a television show, a picture, and a pre-recorded video; and receiving one or more data sets to help satisfy the respective one or more event requests so that the data may be persistently presented in the screen- area inset in response to the one or more event requests without regard to changing the background that does not include said screen-area inset.

7. The media of claim 6, wherein the data representation can include a selection of album art.

8. The media of claim 7, wherein the data representation can further include an environment-attribute representation.

9. The media of claim 8, wherein the data representation can farther include a camera feed.

10. The media of claim 9, wherein the data representation can further include a software-application preview.

11. The media of claim 10, wherein the data representation can farther include an appliance status.

12. The media of claim 11, wherein the data representation can farther include a caller-ID message.

13. The media of claim 12, wherein the data representation can further include a gaming-aspect representation.

14. The media of claim 4, wherein the one or more event requests includes a request to activate the inset.

15. The media of claim 4, wherein the one or more event requests includes a request for screen-location information of the inset.

16. The media of claim 4, wherein the one or more event requests includes a request to adjust the dimensions of the inset, including minimizing and maximizing the inset.

17. The media of claim 4, wherein the one or more event requests includes a request to adjust the picture quality of the inset.

18. The media of claim 4, wherein the one or more event requests includes a request to facilitate input and output of data from the first software application.

19. The media of claim 4, wherein the one or more event requests include information related to a file to be presented in the inset.

20. The media of claim 4, wherein the one or more event requests includes a request to preserve or restore a state of the inset.

21. The media of claim 4, wherein receiving said one or more data sets comprises receiving an acknowledgement to activate the inset.

22. The media of claim 4, wherein receiving said one or more data sets comprises screen-location information related to displaying the inset.

23. The media of claim 4, wherein receiving said one or more data sets comprises an acknowledgement that the inset is prepared to render the data representation.

24. The media of claim 4, wherein receiving said one or more data sets comprises an acknowledgement that the dimensions of the inset are modified.

25. The media of claim 4, wherein receiving said one or more data sets comprises an input and/or output of data from the first software application.

26. The media of claim 4, wherein receiving said one or more data sets comprises information related to a file to be presented in the inset.

27. One or more computer-storage media having computer-useable instructions embodied thereon for performing a method of presenting a data representation communicated from a software application in a screen-area inset of a distance user interface (DUI), the DUI being a graphical user interface (GUI) that is presented to facilitate an operation of a personal-computing computing device from a television-viewing distance, which distance-user interface includes a background area and the screen-area inset within the background area, the method comprising:
  providing said DUI, wherein said DUI comprises a menu display in a first layer, the menu display including a first plurality of selectable links that are disposed within said layer, each selectable link having a functional identifier discernable by a user from said television-viewing viewing distance, wherein said television-viewing distance in feet is approximately half a viewable screen size of said display device measured in inches, said menu display allowing for the operation of said computer, and
  a selectable-link marker indicating which of the first plurality of selectable links has the focus;
  receiving one or more event requests related to rendering data in the screen-area inset, the screen-area inset capable of operating in a plurality of user-selectable modes and that persistently presents a common media experience while navigating from a first screen to a second screen of said DUT, said screen-area inset being disposed within said layer; and
  receiving data necessary to satisfy the one or more event requests so that a data representation may be persistently presented in the screen-area inset in response to the one or more event requests even while the background area that excludes the screen-area inset (excluding the screen area inset) changes.

28. The media of claim 27, wherein said plurality of user-selectable modes is a media-presentation mode.

29. The media of claim 28, wherein said media-presentation mode facilitates presenting one or more of:
  an audio experience, including a control for controlling properties of said audio experience;
  a video-presentation experience including presenting a recorded video that has been recorded on said personal-computing device; and a slide show.

30. The media of claim 27, wherein the data representation comprises at least one of: a picture, a selection of album art, a video, a streaming media presentation, a television program, a camera feed, a software-application preview, an audio rendition, an entertainment depiction, and a gaming-aspect representation.

31. The media of claim 30, wherein the event request comprises at least one of:
  a request to activate the inset;
  a request for screen-location information of the inset;
  a request to prepare the inset to render the data representation;
  a request to adjust the dimensions of the inset, including minimizing and maximizing the inset;
  a request to adjust the picture quality of the inset;
  a request to facilitate input and output of data from the first software application;
  a request to display the inset as a component within a software application;
  a request to display the data representation(s) in response to an inputted key sequence;
  a request for information related to a file to be presented in the inset;
  a request to preserve or restore a state of the inset;
  a request to terminate communication with the inset; and
  a request to redirect said data representation to a communicatively coupled display component, wherein said display component includes at least one of a background display, another window, and another display device including a remote monitor.

32. The media of claim 31, wherein receiving said one or more data sets comprises receiving one or more of the following:
  an acknowledgement to activate the inset;
  screen-location information related to displaying the inset;
  an acknowledgement that the inset is prepared to render the data representation;
  an acknowledgement that the dimensions of the inset are modified;
  an input and/or output of data from the first software application; and
  information related to a file to be presented in the inset.

* * * * *